April 13, 1965 J. RABINOW 3,178,509

TELEVISION PHOTOGRAPHY SYSTEM

Filed Jan. 15, 1962

INVENTOR

Jacob Rabinow

BY Joseph A. Genovese & Max L. Libman

ATTORNEYS

United States Patent Office
3,178,509
Patented Apr. 13, 1965

3,178,509

TELEVISION PHOTOGRAPHY SYSTEM

Jacob Rabinow, Bethesda, Md., assignor, by mesne assignments, to Control Data Corporation, Minneapolis, Minn., a corporation of Minnesota Filed Jan. 15, 1962, Ser. No. 166,095
11 Claims. (Cl. 178—6.7)

Figures 1, 1A, 2:
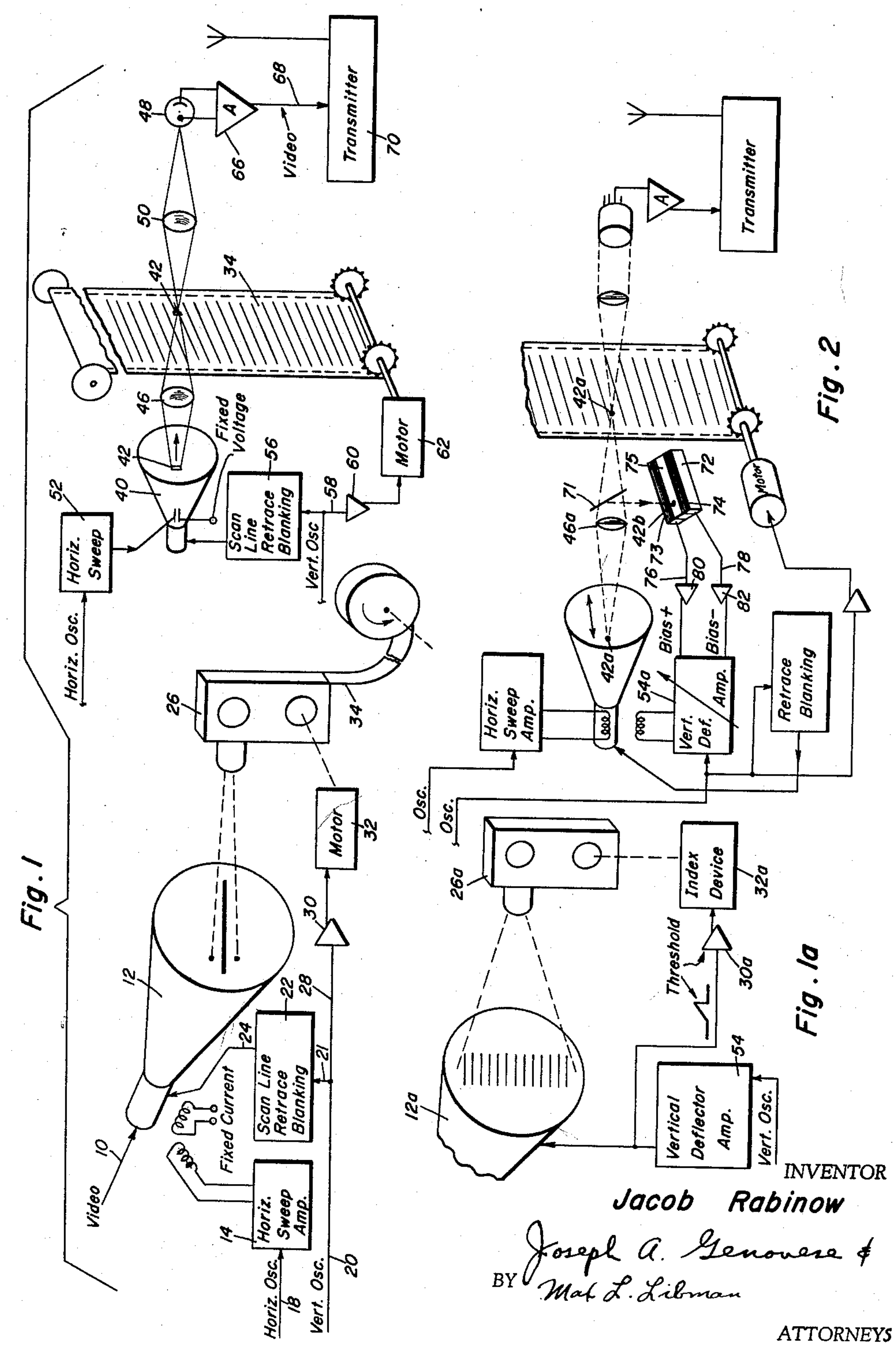

This invention relates to television systems and particularly to a system for providing a photographic record of television performances.

For a long time there have been endeavors to provide a satisfactory record and play-back of a television performance. Even before the wide commercial success of television as an entertainment medium, systems have been proposed to attain this objective. For example, the Goldmark Patent No. 2,177,365 discloses a television system for transmitting television images from ordinary photographic film. Later, kinescope was quite commonly used in this country, and the Mitchell Patent No. 2,735,333 discloses some of the very difficult problems involved. Mitchell mentions various specialized techniques to overcome the problems, none of which has proved fully satisfactory.

It is true that magnetic recording of video information has been successful, but it has its own difficulties, not the least of which is the original cost of the equipment.

My present invention pertains to a photographic film solution to the problem of having a record of performances, as opposed to the magnetic recording technique. In one form of my system I display each line of a field, frame, scene, etc., individually, and photograph each successive line. In the United States, a single frame of a television image is composed of 525 lines displayed so close together that the composite of lines appears as a single picture upon casual observation or viewing of the tube of a television receiver. When making my photographic record I vertically "stretch" the video which forms (or would form) the picture or do what amounts to this by displaying one line at a time and photographing the successive lines.

By proceeding as described above, I will have a photographic film of the successive lines of a frame of a television scene. Furthermore, the line-information of the film will be in an order exactly as originally transmitted, i.e., field-by-field which, when interlaced, forms a frame. Therefore, by following an inverse procedure, i.e., scanning the film record, the recorded video information can be used to produce a new video signal which corresponds exactly to the original video signal from which the photographic record was made. A simple way to do this is to scan the individual lines of the photographic record and transduce the scanner outputs to line-by-line video information which can be retransmitted as modulations of a carrier containing the usual sync pulses which are necessary for ordinary television receivers to properly display the video information.

An important feature of my invention is that the photographic record contains lines which are spaced apart by distances making it practical and, indeed, possible to scan the individual lines on the film without cross-talk between adjacent lines. The large inter-line spacing with dark spaces between lines enables my invention to servo the scanning element to the line. If the scanning element were not servoed, it would be difficult to maintain exact registration between the scanning element and the line of video information recorded on the film.

Therefore, another object of my invention is to provide a photographic record of a television scene by forming successive video information lines on a photographic film, where the video information lines are spaced farther apart than ordinary inter-line spacing of the scan-lines making up the usual television image on the face of the picture tube of a conventional television receiver.

Another object of my invention is to provide a technique for photographing the displayed lines of video information with the comparatively large inter-line spacing discussed above. I spoke previously of "stretching" the television field or frame to achieve this end. If a television field were simply vertically stretched so that there were three or four times the usual inter-line spacing I would introduce a problem of servoing the camera optical system to the successive lines, for example starting at the top of the vertically stretched picture and ending at the bottom. However, an easier way to achieve the same result is to maintain the optical axis of the camera fixed and to display each line successively at the same place on the face of a cathode ray tube. Accordingly, lines 1–262 inclusively of each single field will be formed successively at the same place on the face of the display tube. According to another form of my invention, I vertically stretch each field (by increasing the line spacing), and photograph the entire field. This gives me a photographic record of successive fields, but the individual lines are spaced farther than normal. Here again, I will not introduce a problem of servoing the camera optics to the lines because the camera field of view is assumed to cover the entire field.

Another object of my invention is to provide a comparatively inexpensive way of providing a photographic record of a television performance which is well suited for transmission and re-transmission.

Other objects and features will become apparent in following the description of the illustrated forms of the invention.

FIGURE 1 is a diagrammatic, principally perspective view of a system, in accordance with my invention.

FIGURE 1*a* is a fragmentary view showing a modification.

FIGURE 2 is a diagrammatic perspective view similar to FIGURE 1 but showing various modifications.

In the accompanying drawings reference is first made to FIGURE 1 showing video line 10 which is assumed to conduct video information obtained by the customary television camera equipment. Cathode ray tube 12 is a display tube with a low persistence screen, such as the tube of many oscilloscopes. Horizontal sweep amplifier 14 for the horizontal deflection coil of tube 12, receives signals over line 18 from a horizontal oscillator. The vertical deflection coil of tube 12 is connected to a fixed (or manually adjustable) current source. Retrace blanking circuits 22 are controlled by vertical oscillator input line 21, and provide an output on line 24 to the tube 12.

The operation of an ordinary television receiver, as far as it is pertinent to my invention is as follows: The video information is transmitted along with vertical and horizontal sync pulses. A vertical sync pulse starts a single field, i.e., line "one" thereof, and the horizontal sweeps are triggered by the horizontal sync pulses. As the lines sweep across the face of the tube, the video information of each line is displayed as increasing and decreasing tube-luminescence along the lines. When each single line is finished, the electron beam of the tube is blanked during retrace by the blanking circuits 22. In my system, I photograph each individual line to make a record of the video.

In order to overcome the problem of having to servo the optics of camera 26 to lines which occur one-below-the-other on the face of tube 12, I retain the optical axis of my camera fixed. This means that I should display each of the 262 lines of a single field at the same place on the face of tube 12. To do this the vertical voltage is kept constant so that each of the lines of a single field appear in the same place on the face of the display tube 12. Line 28 is connected to vertical oscillator line 20 and line 28 has an amplifier 30 whose output operates a synchronous motor or the equivalent. Therefore, the film 34 in camera 26 is moved in synchronism with the video signal and the image on the face of the display tube 12 (each successive, discrete line of video information) is photographed. The result is that the film will be a record of the video information, line-by-line as originally transmitted to form pictures on the face of a picture tube of an ordinary television receiver.

After the film record has been prepared, it may be used to retransmit the television performance at any location, and any number of times. However, since the photographic film record is not in the ordinary photographic frame-by-frame arrangement, the play-back from the film requires special equipment. This equipment, though, is not complex and could be made available at low cost. The right side of FIGURE 1 shows an optical scanner 40 producing a vertical, rectangular scan element 42 on the face of a cathode ray tube. A fixed lens system 46 is located between the film record 34 (photographic negative) and the scan element 42, and there is a photocell 48 on the opposite side of the film record with a lens system 50 between the photocell and the film record. Essentially the same type of circuitry can be used to operate the flying spot scanner 40 as used to control the sweep of tube 12. Thus, the horizontal sweep circuit amplifier 52 is operatively connected with the tube 40 and the horizontal oscillator source. At the time that would correspond to the retrace blanking for tube 12, a retrace blanking circuit 56, will operate to blank the scanner element 42 although blanking can also be applied to the photocell output. Line 58 having amplifier 60 is connected to the vertical oscillator and to motor 62. The amplified signal on line 58 operates the motor 62 functioning as the power source for a pull-down device for the film 34 which operates at the same speed as motor 32.

The photocell 48 can be of any suitable type of example a photomultiplier feeding amplifier 66 whose output line 68 conducts the video which is transduced from the optical record (lines of the film negative 34). The video signal on line 68 can be super-imposed on a carrier together with the necessary sync signals to be transmitted by transmitter 70.

FIGURE 1*a* shows another form of my invention, where the image of each field is photographed to make a film record containing the lines of successive complete fields. Tube 12*a* and the nature of its control circuits are the same as in FIGURE 1, except that a conventional vertical deflection amplifier 54 is connected to the vertical deflection coil of tube 12*a*. In use, the control circuits are adjusted so that the image of the field is small with respect to the area of the tube face, and then the field is vertically "opened" or "stretched" by adjusting the vertical deflection amplifier 54. Thus, camera 26*a* photographs the vertically spaced lines of each field (or frame) which sequentially appears on the face of tube 12*a*.

The film transport (not shown) of camera 26*a* is continuously actuated, e.g., by a motor corresponding to motor 32 (FIGURE 1). Since the field rate on tube 12*a* is only sixty fields per second, a conventional motion picture camera could be used. On the other hand, I can use an indexer 32*a* for the film transport, which operates during the field retrace time i.e., when the beam of tube 12*a* moves from line 262 to the beginning of line "one" of the next field. A simple way to do this is to have an amplifier 30*a* with a threshold the same as the peak voltage of the sawtooth output of amplifier 54, connected by line 28*a* to indexer 32*a*. Although, I photograph sixty full fields per second, the lines of each field are widely spaced in comparison to the usual line spacing of a television image. The film record produced by the systems of FIGURE 1 and/or 1*a* are played back by the equipment shown at the right side of FIGURE 1 or shown in FIGURE 2 (described later) or the equivalent. Had I photographed the scan lines close together, the scan element 42 (or 42*a* in FIGURE 2) could not be much larger than the thickness of a line on the film, otherwise small misalignment would produce cross-talk between lines on film 34 during scanning. Thus, an advantage of forming the photographic record with the lines widely spaced as shown in FIGURES 1 and 2, is that the scan element may be made considerably larger without ever touching more than one line at a time. Another advantage of the large-interline spacing on the film record 34 is the simplification of servoing the scan element to the line on the film record. This feature is shown in FIGURE 2.

A simple servo system consists of a semi-transparent mirror 71 intercepting "half" of the light in the optical system 46*a* and reflecting it to the surface of a photosensitive device 72. The photosensitive device is made of two strip photocells 73 and 74 with an insensitive area 75 therebetween. The insensitive area 75 is parallel to the lines of video information photographically recorded on record 34 so that as scan element 42*a* traverses the record 34, a corresponding scan element 42*b* traverses the area 75. Should the spot of light on device 72 touch either of the strip photocells, bias signals on lines 76 or 78 respectively would be produced; amplified at 80 or 82, and applied to the vertical deflection amplifier 54 to provide a correction in the vertical direction (up or down) to servo the scan element 42*a* back to the line of the record 34 which is being scanned.

It is understood that if the scan element-to-line registration can be maintained reasonably accurate, the servo system shown in FIGURE 2 will be unnecessary. Wide inter-line spacing materially aids in the necessary scan element-to-film record line registration because the scan element can be made comparatively large, especially as a vertical window as in FIGURE 1, providing for large tolerances. It is further understood that the system disclosed in the drawings is given by way of example only. I have shown a scanner 40 with control circuitry that can be very materially varied to achieve the same purpose. The camera 26 is merely diagrammatically illustrated, it being understood that my system will use a commercially available, high speed photographic camera. Other variations and modifications may be made without departing from the protection of the following claims.

I claim:

1. In a television system wherein a scene is examined to provide video signals which are ordinarily used to form a television image composed of lines that are so closely spaced that the image appears as a single picture upon ordinary viewing; the improvement comprising means to display said lines in such a manner that they appear discrete, means to form an optical density modulated photographic record of the discrete lines, means operative while said record is being formed for providing inter-line spacing larger than the normal spacing of said lines of said image thereby providing tolerance for subsequent examination of each line of said record when producing new signals from said record.

2. In a television system wherein a scene is examined to provide video signals which are ordinarily used to form a television image composed of light intensity modulated lines that are so closely spaced that the image appears as a single picture upon ordinary viewing; the improvement comprising means to sequentially display said lines, and means to form a photographic record of the intensity modulated discrete lines, means providing inter-line spacing of the lines of the record larger than the normal spacing of the lines of said image to facilitate the producing of new video signals corresponding to the original video signals, an examination device for the lines of said record, a photocell associated with said examination device, and means associated with said photocell for providing said new video signals.

3. The subject matter of claim 2 wherein the last-mentioned examination device is a scanner.

4. The subject matter of claim 3 and means to servo said scanner to the individual lines of said photographic record.

5. The subject matter of claim 4 wherein said servo means are photosensitive and provide servo signals when the scanner-to-photographic record position drifts from alignment.

6. The subject matter of claim 2 wherein said examination device includes a scanner which projects and moves a spot of light rectilinearly lengthwise of a line of said record.

7. The subject matter of claim 2 wherein said examination device includes a scanner which projects and moves a spot of light rectilinearly lengthwise of a line of said record, and means to servo said spot of light to said record line when the light spot appears on the said space between photographic record lines.

8. The subject matter of claim 3 wherein said scanner provides a scan element which traverses each successive line of said record rectilinearly lengthwise of the line, and means coupled with said scanner to move said record in coordination with said scanner.

9. A television photography system to provide a photographic record of a television scene where the television information is produced in the usual field sequential manner and the fields are composed of individual light intensity modulated lines, means to display said individual lines, and means to individually photograph said lines and form a photographic negative having said lines spaced apart by at least one line thickness to thereby provide interline spacing tolerance sufficient to facilitate subsequent scanning of each line.

10. In a television system providing video information, means to display said information line-by-line, means for forming a record of the line-by-line display, and means operative during recording for providing interline spacing larger than the width of a single record line.

11. The system of claim 10 wherein said record is photographic.

References Cited by the Examiner

UNITED STATES PATENTS

| | | | |
|---|---|---|---|
| 2,681,382 | 6/54 | Hilburn | 178—6.7 |
| 2,849,180 | 8/58 | Burke et al. | 250—217.1 X |
| 2,945,414 | 7/60 | Blackstone | 178—6.7 |
| 3,151,215 | 9/64 | Goldberg | 178—6.7 |

DAVID G. REDINBAUGH, *Primary Examiner.*

ROBERT SEGAL, *Examiner.*